Sept. 22, 1942.   A. N. GUY   2,296,345
SALES DISPLAY DEVICE
Filed March 28, 1941
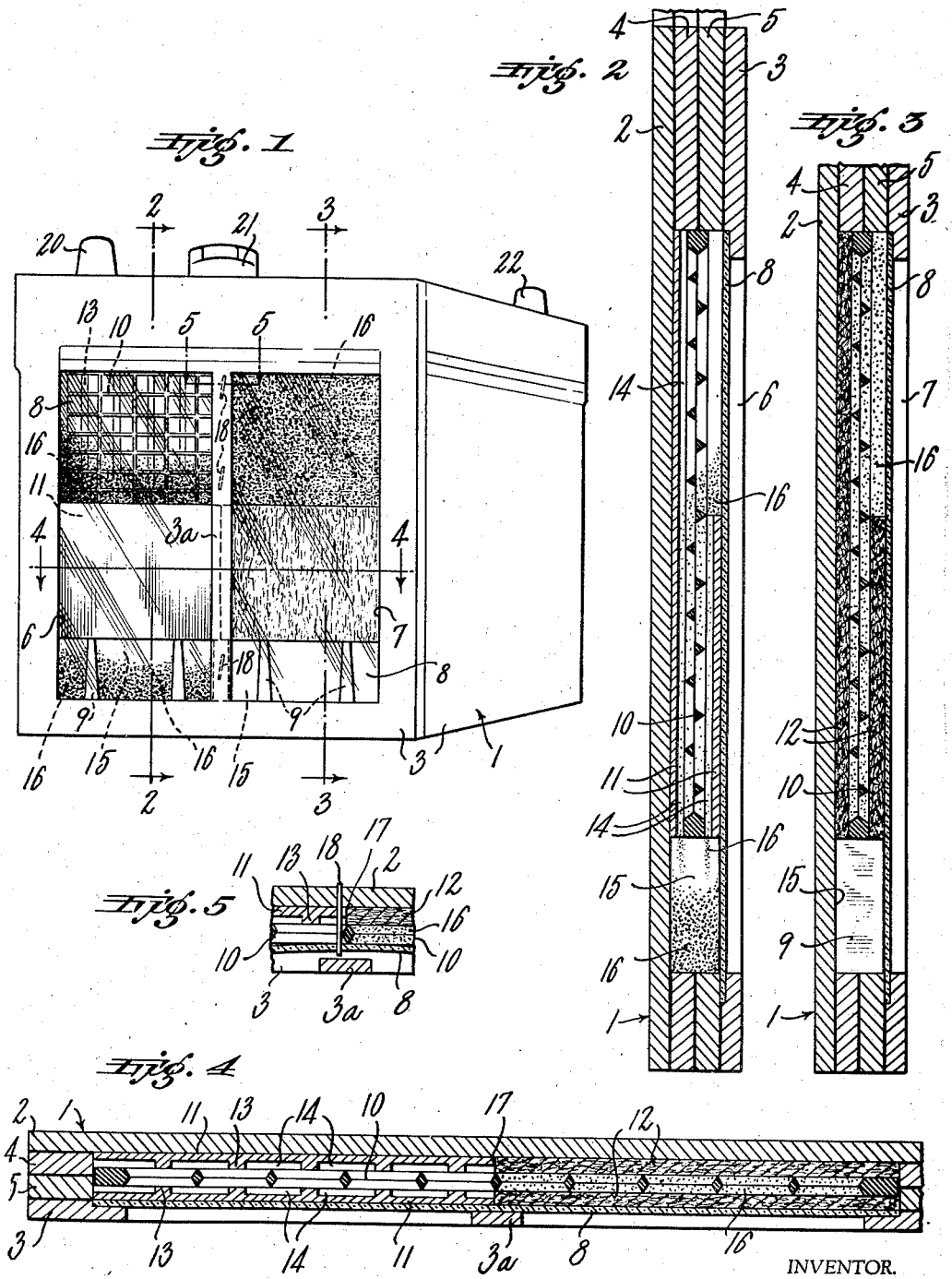
INVENTOR.
ALBERT N. GUY
BY Lester J. Bindlong
ATTORNEY Patented Sept. 22, 1942

2,296,345

UNITED STATES PATENT OFFICE 2,296,345

SALES DISPLAY DEVICE

Albert N. Guy, Manhasset, N. Y., assignor to United States Rubber Company, New York, N. Y., a corporation of New Jersey Application March 28, 1941, Serial No. 385,651

3 Claims. (Cl. 35—51)

This invention relates to a sales display device for visually illustrating the deterioration of storage batteries employing plate spacing members having channels, between the surfaces of the plates and their surfaces respectively, through which flakes or granules of lead oxide separated from the plate escape from the spaces or interstices of the grid frame of the plates and fall to the bottom of the battery container, compared with similar batteries employing facing members which retain the lead oxide flakes or granules within the spaces or interstices of the grid frame of the plates.

It has heretofore been common practice to employ in the structure of wet storage batteries, of the kind employed, for example in automobiles, an alternate series of positively and negatively polarized metal plates, each comprising a grid frame, usually formed of lead and antimony, over which a paste of lead oxide is placed covering the grid frame and filling its interstices; and to separate successive plates by spacing members which commonly are made of wood. The lead oxide gradually sheds off the grid frame of the plates in small particles or granules and unless the granules fall clear of the wooden spacing member they penetrate the pores of the spacing member and "tree" out through the spacing member i. e. they adhere to one another forming a mass which increases in size, and which eventually extends itself entirely through the spacing member and causes a short circuit between the plates located on either side of the spacing member. Primarily for this reason the wooden spacing members are provided with vertical ribs protruding from the spacing member toward the adjacent plate, thus providing vertically extending channels between the ribs through which the flakes or granules of lead oxide fall to the sump in the bottom of the battery container.

The channels in the faces of the wooden spacing members are provided secondarily to bring a greater volume of the electrolyte solution more freely into contact with the lead oxide which is the power generating material of the battery. Thus even when a material such as microporous rubber stock, which is not generally penetrated by the lead oxide particles, is used to form the spacing members, they are ribbed in the same manner as the wooden spacing members.

As the granules of lead oxide separate from the plates of the battery and fall into the sump at the bottom of the battery container, the power generating strength of the battery is progressively weakened and the life of the battery is shortened.

To overcome this condition it has heretofore been suggested to cover the faces of the plate with a suitable non-conductive material which is sufficiently porous to permit the desired degree of contact between the electrolyte and the lead oxide, but which is not conducive to "treeing." Since the lead oxide granules, if retained in the spaces of the grid frame of the plate, continue to generate power, facings of such material applied to opposite surfaces of the plate to confine the lead oxide granules within the spaces of the grid frame, serve to maintain the strength and lengthen the life of the battery. Very satisfactory results have been obtained using facings of spun glass fabric, which is both porous and non-conductive, to cover the surfaces of the plate and prevent the escape of the granules of lead oxide which have separated from the plate. Batteries employing spacing members separated from the plates by facings of spun glass material extending over the respective surfaces of the plates and confining the lead oxide material have proven to have a far longer life than similar batteries not provided with the spun glass facing material on the plates.

I have found that it is very difficult, for many dealers and other purchasers of wet storage batteries, to visualize the internal structure of storage batteries described above, and it is therefore difficult for them to understand the advantages derived from using facings of porous fabric, such as spun glass, to retain the granules of lead oxide within the spaces of the grid frames of the battery plates. This invention is directed to a display device for visually demonstrating the cause of deterioration of storage batteries not employing such facing material and how this cause of deterioration is overcome in storage batteries using such facings.

In carrying out my invention I have provided a rectangular frame, simulating a storage battery as viewed from an end, having windows through which a grid member may be seen supported above a sump, and having ribbed spacing members, on opposite sides of a portion of the grid member, without interposed facings, and having facings of spun glass fabric overlying opposite faces of another portion of the grid member; and granular material, which may be sand artificially colored to resemble lead oxide granules, retained in the spaces or interstices of the grid member between the facings of spun glass fabric, but able to flow out of the spaces or interstices of the grid member between the spacing members having vertical ribs, into the sump, through the channels provided between the said ribs of the spacing members.

The invention will best be understood if the following description is read in connection with the drawing, in which, Fig. 1 is a front elevation of my demonstrating device;

Fig. 2 is a vertical section taken on the line 2—2 of Fig. 1;

Fig. 3 is a vertical section taken on the line 3—3 of Fig. 1;

Fig. 4 is a transverse section taken on the line 4—4 of Fig. 1; and

Fig. 5 is a detail view taken on line 5—5 of Fig. 1.

The numeral 1 indicates a frame-like closure, comprising back member 2, front member 3, and frame spacing members 4 and 5, said front member having windows 6 and 7 across which a transparent material 8, such for example as glass, isinglass, Cellophane, etc., are mounted. The spacing members 4 and 5 are cut out centrally providing a space between the back member 2 and the front of the device which comprises the sheet of transparent material 8, and the frame member 3. Extending upwardly from members 4 and 5 in the space thus provided are the spaced projections 9, which simulate longitudinal ribs of a storage battery on which the plates and spacing members are commonly supported, and which serve in my device to support a grid member 10, the wooden spacing members 11, (which are visible through window 6) and the facings of spun glass fabric 12 (which are visible through window 7).

The wooden spacing members 11 are provided with vertically extending ribs 13 projecting from the faces of the spacing member toward the respective surfaces of the intermediate grid member 10, forming channels 14 communicating between the spaces or interstices of the grid member 10 and the spaces between the upwardly extending projections 9 which are identified collectively as a sump 15. Granular material 16 contained in the closure, and which as illustrated herein is sand, is thus freely transferable between the spaces or interstices of the grid member 10 and the sump 15, through channels 14. The facings of spun glass fabric 12, however, retain the sand in the spaces or interstices of the grid member to the right of the dividing line 17, which extends vertically between the portion of the grid member having facings of spun glass and the portion which does not, behind vertically extending portion 3a of frame member 3 which separates windows 6 and 7, and prevents transfer of sand to the sump 15. The dividing line 17, Fig. 4, between the portion of the grid 10 not covered with spun glass facing material and the portion which is covered by such facing material, may be formed in any suitable way as by drawing the transparent material 8 into close contact with the face of the grid member 10, by clips 18 which may extend through the grid member 10 and the backing member 2.

As illustrated in Fig. 1, the upper portion of the front wooden plate spacing member 11, and the upper portion of the front facing of spun glass fabric 12, are each cut away to expose portions of the grid member 10.

At the upper end of my device the protuberances 20, 21 and 22 may be provided, preferably formed integrally with the frame spacing members 4 and 5, simulating respectively a battery terminal, a plug or cap of the kind which are provided in storage batteries to give access to the interior of the battery for introducing or replenishing the electrolyte solution, and another battery terminal.

In the portion of the sump 15 viewed through window 6, I have shown a quantity of sand 16 while none is present in the portion of sump 15 viewed through window 7. When my device is in vertical position the sand, which is initially in the spaces of the grid member, will flow into the sump 15 from the portion of the grid to the left of dividing line 17, as viewed by the reader, and as my device is moved from upright position shown in Fig. 1, to upside down position the sand will be returned from the sump 15 to the spaces or interstices of the grid to the left of dividing line 16. But during any manipulation of my device, the sand contained in the grid spaces or interstices to the right of the dividing line 17 will not be displaced.

Thus my device demonstrates visually and simultaneously the retention of lead oxide granules in a battery employing plate facings, such as porous, nonconductive and unribbed spun glass fabric facings, and the loss of the lead oxide granules in a battery not provided with such facings.

Having thus described my invention what I claim and desire to protect by Letters Patent is:

1. A display device comprising in combination a battery grid member having spaces therein for receiving paste, a separator plate held against each side of the grid, one of the separator plates having a transparent opening therein, a container for said plates and grid having a receiving space below the plates and grid, said container having a transparent panel adjacent the separator plate which has the transparent opening, the panel extending over said opening and over said receiving space and loose free flowing granular material within the container.

2. A display device comprising in combination a battery grid member having spaces therein for receiving paste, a channeled separator plate held against each side of the grid, the channels communicating with said spaces, one of the separator plates having a transparent opening therein, a container for said plates and grid having a receiving space below the plates and grid and communicating with the channels, said container having a transparent panel adjacent the separator plate which has the transparent opening, the panel extending over said transparent opening and over said receiving space and loose free flowing granular material within said container.

3. A display device comprising in combination a battery grid member having spaces therein for receiving paste, an inert fibrous separator held against each side of the grid, one of the separators having a transparent opening therein, a container for said grid and separators having a space below the grid and separators, said container having a transparent panel adjacent the separator having the transparent opening, the panel extending over said transparent opening and over such space below the grid and separators and loose free flowing granular material in said spaces in the grid.

ALBERT N. GUY.